Oct. 21, 1952     O. P. SATHER     2,614,694
OIL FILTER CARTRIDGE

Filed June 20, 1949     2 SHEETS—SHEET 1

INVENTOR
O. P. SATHER
BY
ATTORNEY

Oct. 21, 1952     O. P. SATHER     2,614,694
OIL FILTER CARTRIDGE
Filed June 20, 1949     2 SHEETS—SHEET 2
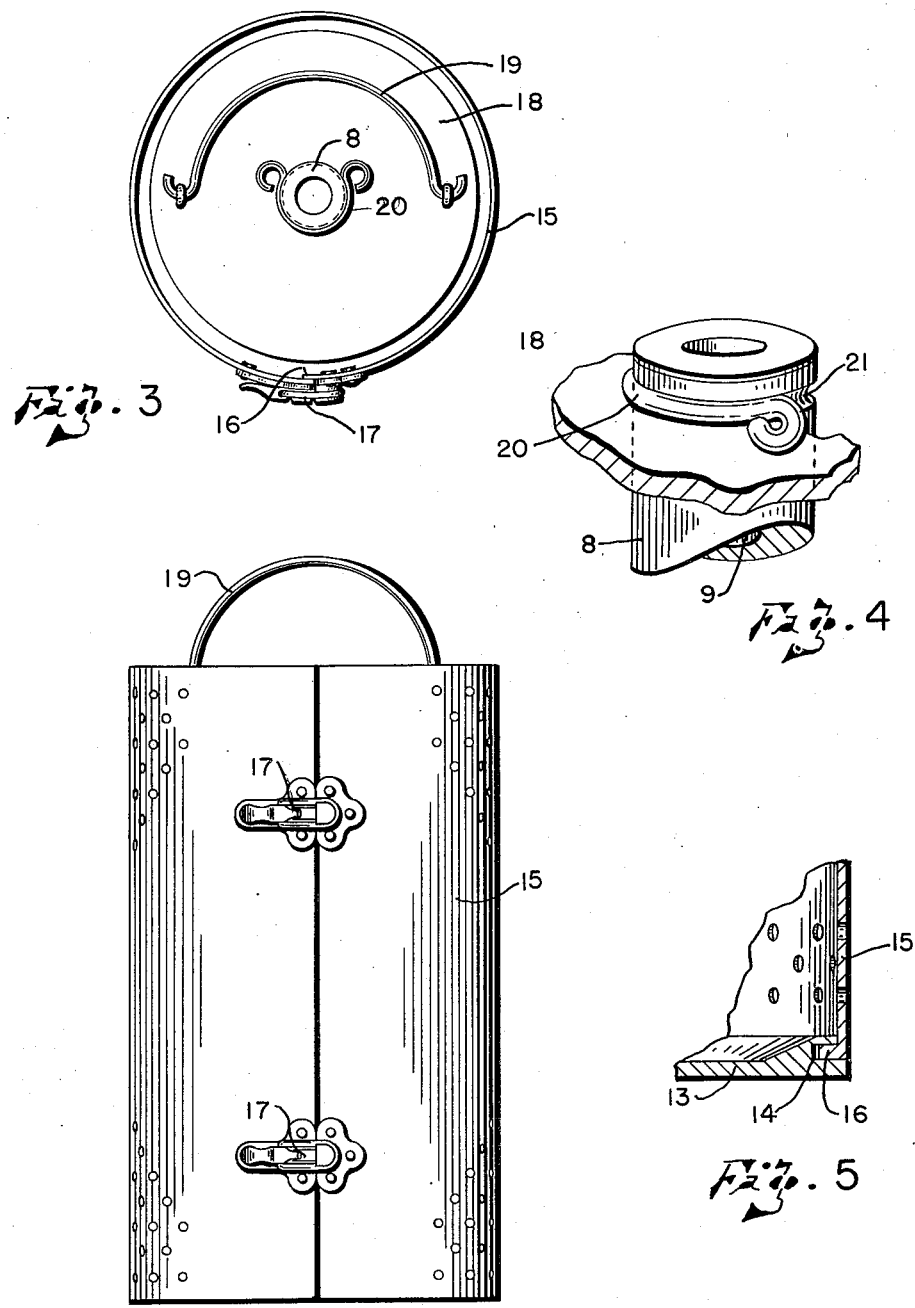
INVENTOR
O. P. SATHER
BY S. Geo Stevens
ATTORNEY

UNITED STATES PATENT OFFICE 2,614,694

OIL FILTER CARTRIDGE

Olaf P. Sather, Duluth, Minn.

Application June 20, 1949, Serial No. 100,236

1 Claim. (Cl. 210—131)

This invention relates to filters, and has special reference to a removable cartridge for oil filters.

It is well known that engines require a lubricating system, and in late years, filters have been provided in the system to clarify the oil used continuously so that as much use as possible may be obtained from a given quantity of oil. Some of the oil filters now have a removable cartridge within the filter casing, and this cartridge contains the filtering medium (usually cotton waste or wood cellulose) within a shell or casing of as inexpensive material and construction as possible, as the cartridge must be discarded and replaced with an entirely new cartridge after being used for a given period, as the filtering medium becomes saturated with dirt collected from the oil as it passes therethrough, and soon loses its ability to filter efficiently.

It is one of my principal objects to provide a filter cartridge from which the used filtering medium may be removed quickly and easily for disposal and which may be repacked with new filtering medium just as easily so that the cartridge casing may be used repeatedly.

Another object is to provide a filter cartridge which may be repacked at much less cost than that of buying a new cartridge as is presently practiced.

Another object is to provide a repackable filter cartridge of simple construction so that a skilled technician is not required to repack same.

Another object is to provide a repackable filter cartridge which is of sturdy construction so that it may be handled repeatedly, and yet is not expensive in comparison to filter cartridges now in use.

Another object is to provide a filter cartridge of knock-down construction which may be assembled and knocked down quickly and easily.

These and other objects and advantages will become more apparent as the description of the invention proceeds.

In the accompanying drawing forming a part of this application:

Fig. 2 is an elevational view of my assembled filter cartridge.

Fig. 3 is a top plan view of Fig. 2.

Fig. 4 is a perspective view of the cover retainer means.

Fig. 5 is an enlarged vertical sectional view of one lower corner of my cartridge showing the screen carrying means.

Figure 1:
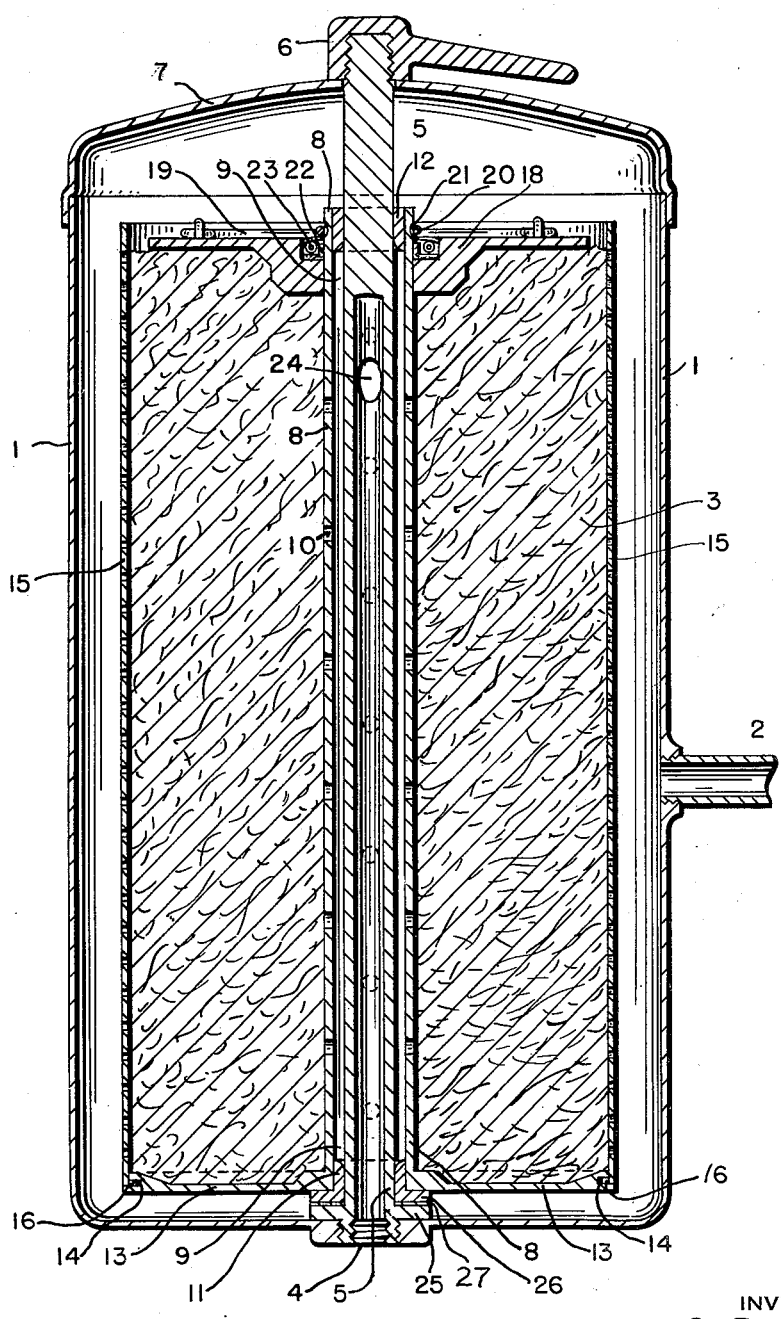
Fig. 1 is a vertical central sectional view of an oil filter showing my invention in operating position.

In the drawing the reference numeral 1 indicates the oil filter casing in which the oil filter cartridge is carried when in use, it being well known that in operation the dirty oil is pumped through the inlet 2 into the casing 1 where it passes through the filtering medium 3 and back into the oil system through the outlet.

It is common construction of oil filters to have a rod 5 mounted vertically in the casing 1 on which the filter cartridge is carried, and which has a threaded upper end to receive the nut 6 which holds the cover 7 of the filter casing firmly in place.

My filter cartridge comprises a central stem or tube 8 which has a longitudinal bore 9 therein which is closed at one end, and which connects with the outlet 4 at the opposite end, therebeing suitable holes 10 through the tube to permit clean oil filtered by the filtering medium to enter the bore, a suitable bushing 11 being provided on the lower end of the tube 8 and another bushing 12 at the upper end of the tube 8 to receive the rod 5 when the cartridge is in place as shown.

The base 13 is provided with a preferably circumferential groove 14 which provides means to hold the screen 15 of the filter cartridge in conjunction with a suitable flange 16 on the lower edge of the screen. Either a plurality of spaced, inwardly projecting lugs may be welded or otherwise provided on the lower edge of the screen, or a length of wire (not shown) may be welded along the lower inner edge of the screen, or the lower edge of the screen may be rolled inwardly to provide the necessary flange to be received in the groove 14 to hold the screen in place on the base 13. The screen 15 is preferably made of one piece of relatively heavy gauge, reticulate sheet metal so as to retain its shape under repeated handling, and is formed to an elongated cylinder as shown. The edges of the metal screen 15 which come together to form the cylindrical shape are preferably overlapped slightly as at 16 and a pair of spaced snap spring locks 17 are provided to hold the screen cylinder tightly assembled. It is deemed apparent that the screen may be readily mounted on the base by placing the flange 16 within the groove 14 before the snap spring locks 17 are secured to hold the screen in its desired cylindrical shape and firmly in the groove making a very rigid assembly.

The upper end of the tube 8, carries a cover 18 which has an axial hole therein to receive the bushing 12, and has a pivotal handle 19 secured thereto to provide ease in handling the cartridge. The cover is preferably held on the tube 8 by means of substantially U-shaped spring wire retainer 20 which is sprung into the annular groove 21 in the periphery of the tube just above the cover. This retainer 20 provides a secure fastening to hold the cover from being pulled off of the tube 8 when carrying the cartridge by the handle 19 holds the cover firmly against the filtering medium, and also permits ready removal of the cover from the tube by merely slipping the retainer out of the groove and off of the tube. It is to be noted that the cover 18 is of less diameter than the screen cylinder 15 and fits just below the upper end of the screen to facilitate the packing of the filtering medium.

The cover 18 is prevented from sliding down the tube 8 when installed thereon, obviously, by its engagement with the filtering medium 3, and in addition, a leather seal 22 is provided in a suitable recess in the cover and is held in place by a spring ring 23, and this seal prevents dirty oil from leaking onto the cartridge along the tube 8 and also is sufficiently tight to frictionally hold the cover in its uppermost position when no filtering medium is in the cartridge.

It is deemed apparent that with the cover 18 removed, and the screen 15 opened and removed from the base, old and dirty filtering material may be easily and very quickly removed from around the tube 8, by merely sliding same therefrom away from the base. In addition the filter may be easily and quickly repacked with new filtering material by re-mounting the screen 15 on the base 13 and securing the snap locks 17, then packing the filtering material in through the open end of the cartridge in the open area between the tube 8 and the screen 15. After the cartridge is filled the cover 18 may be put on and pressed firmly against the filtering medium and the retainer 20 sprung into place in the groove 21 to hold the cover in place and the cartridge is ready for re-use as desired.

Using my cartridge, the only waste involved is in the filtering medium which cannot be reclaimed economically. No metal is thrown away as in the present throw away cartridge and due to the durable construction of my cartridge it will last the life of the vehicle on which it is used, and permit change of filter material more frequently due to lower cost, and this, of course, will prolong the useful life of the lubricating oil as the vehicle itself due to its having more clean lubricating oil.

In operation, it is deemed apparent that oil will enter the casing 1 through the inlet 2, pass through the screen 15 and filter medium 3 and into the bore 9 by way of the holes 10 in the tube 8. The rod 5 is hollow to a point adjacent the upper end thereof as shown, and an opening 24 is provided in the rod adjacent the upper end thereof to permit oil to enter the rod and pass through the outlet 4 and back into the lubricating system.

The lower end of the rod 5 has a flange or collar 25 which abuts the bottom of the casing when the rod is in place, and the bushing 11 has a collar 26 corresponding to the flange 25, and to seal the connection between the rod 5 and the tube 8 so that dirty oil cannot enter the tube a cork gasket 27 is placed between the two collars as shown.

Having thus described my invention, what I claim is:

A repackable oil filter cartridge comprising a relatively thin metallic disc base having a groove in the periphery thereof, an elongated hollow cylinder of metallic mesh material carried by said base and extending therefrom in a direction normal to the plane of said base whereby a container is formed to receive filter material, a flange extending inwardly from one edge of said cylinder and into said groove to provide the mounting for said cylinder on said base and to rigidify the normal shape of said container, a tube carried centrally of said base and extending within and substantially axially of said cylinder, a cover carried by said tube to close the upper end of said container, said cylinder being split longitudinally, and fasteners for securing the longitudinal edges of said cylinder together to clamp same securely in place on said base and to release said edges to permit said cylinder to be sprung open whereby it may be readily removed from said base and whereby filter material packed therewithin may be readily removed therefrom.

OLAF P. SATHER.

REFERENCES CITED

The following references are of record in the file of this patent:

UNITED STATES PATENTS

| Number | Name | Date |
|---|---|---|
| 575,478 | Haefner | Jan. 19, 1897 |
| 858,154 | Conversy | June 25, 1907 |
| 1,225,993 | Mullaney | May 15, 1917 |
| 1,371,422 | Isidor | Mar. 15, 1921 |
| 1,941,982 | Gill | Jan. 2, 1934 |
| 2,223,701 | Olson et al. | Dec. 3, 1940 |
| 2,487,146 | Lasky | Nov. 8, 1949 |

FOREIGN PATENTS

| Number | Country | Date |
|---|---|---|
| 2,126 | Great Britain | 1907 |
| 346,094 | France | Sept. 7, 1904 |